(12) United States Patent
Creager et al.

(10) Patent No.: US 7,046,586 B1
(45) Date of Patent: May 16, 2006

(54) AUTOMATED HARDWARE SENSING AND LIBRARY CONFIGURATION

(75) Inventors: Robert S. Creager, Berthond, CO (US); James Ries, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 1174 days.

(21) Appl. No.: 09/638,368

(22) Filed: Aug. 15, 2000

(51) Int. Cl.
*G11B 21/08* (2006.01)
*G06F 17/30* (2006.01)

(52) U.S. Cl. .............................. 369/30.28; 369/30.38; 707/1; 711/100; 700/218

(58) Field of Classification Search ............. 369/30.28, 369/30.27, 30.29, 30.3, 30.31, 30.32, 30.34, 369/30.38, 30.39, 30.4, 30.41; 700/214, 700/218, 190, 217, 259; 707/204; 711/111, 711/100

See application file for complete search history.

(56) References Cited

U.S. PATENT DOCUMENTS

| 5,164,909 | A | | 11/1992 | Leonhardt et al. |
| 5,323,327 | A | | 6/1994 | Carmichael et al. |
| 5,870,732 | A | * | 2/1999 | Fisher et al. .................... 707/1 |
| 5,946,160 | A | | 8/1999 | Ohashi |
| 6,031,798 | A | * | 2/2000 | James et al. ............. 369/30.28 |
| 6,113,341 | A | | 9/2000 | Fukushima |
| 6,574,641 | B1 | * | 6/2003 | Dawson et al. ............. 707/204 |
| 6,791,910 | B1 | * | 9/2004 | James et al. ............. 369/30.28 |

FOREIGN PATENT DOCUMENTS

| EP | 0 475 624 A1 | 3/1992 |
| EP | 0 989 550 A1 | 3/2000 |

* cited by examiner

*Primary Examiner*—Ali Neyzari
(74) *Attorney, Agent, or Firm*—Yee & Associates, P.C.

(57) ABSTRACT

A method and apparatus for automatically configuring a robotic storage media library is disclosed. The disclosed invention utilizes software to interpret signals from specially designed hardware to determine the hardware characteristics of the library at startup. The software then uses these characteristics to automatically configure the library without user intervention.

26 Claims, 7 Drawing Sheets

AUTOMATED HARDWARE SENSING AND LIBRARY CONFIGURATION

BACKGROUND OF THE INVENTION

1. Technical Field

The present invention relates generally to the automatic configuration of a storage device and more particularly to a method and apparatus for automatically configuring a robotic media storage library without user intervention.

2. Description of Related Art

Robotic media storage libraries are devices for providing automated access to a large collection of data stored on multiple physical storage media, such as magnetic tape cartridges or compact discs. Robotic media storage libraries generally contain a plurality of storage locations for physical media, one or more media drives for reading or writing physical media and a manipulator for moving physical media from a storage location to a drive and back. Robotic media storage libraries may have special storage locations designated for certain purposes, such as serving as a temporary storage location while two pieces of media are being swapped or for adding or removing physical media from the library.

Just like automobiles, which come in different colors with different selections of features, these libraries allow for a great deal of variation and customizability. For instance two libraries from the same manufacturer may be a different size, have a different capacity, have optional features, etc. It is also possible to make modifications to an existing library, to increase its capacity, for instance. This becomes a problem for the software that must control the library, however, because the control software must be aware of all the specific characteristics of the library before controlling it.

Configuration software must be used to set up the control software to operate the library. This software can become very complex to use, because the user of the software must navigate through a barrage of different configuration options, and an inexperienced user may not be completely aware of the hardware characteristics of his or her particular library. This makes configuration a frustrating and time-consuming process, particularly when the library has to be reconfigured by people other than the original installers of the library.

Therefore, it would be advantageous to have a method and apparatus for configuring a robotic media storage library automatically, without a user having to manually set configuration options.

SUMMARY OF THE INVENTION

The present invention provides a method and apparatus for automatically configuring a robotic storage media library, which may store tape cartridges, compact discs, floppy disks, or other storage media. Upon initialization or re-initialization of the library, configuration software detects the hardware characteristics of the library from specially designed hardware. The software then uses these characteristics to make configuration settings in the software that controls the library. These characteristics include but are not limited to the type/model and capacity of the library; the number, type, and arrangement of media drives in the library; and the number and capacity of access ports for adding or removing media from the library. The invention makes it possible to have one piece of storage library control software that is usable in a variety of different models/types and configurations of libraries.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
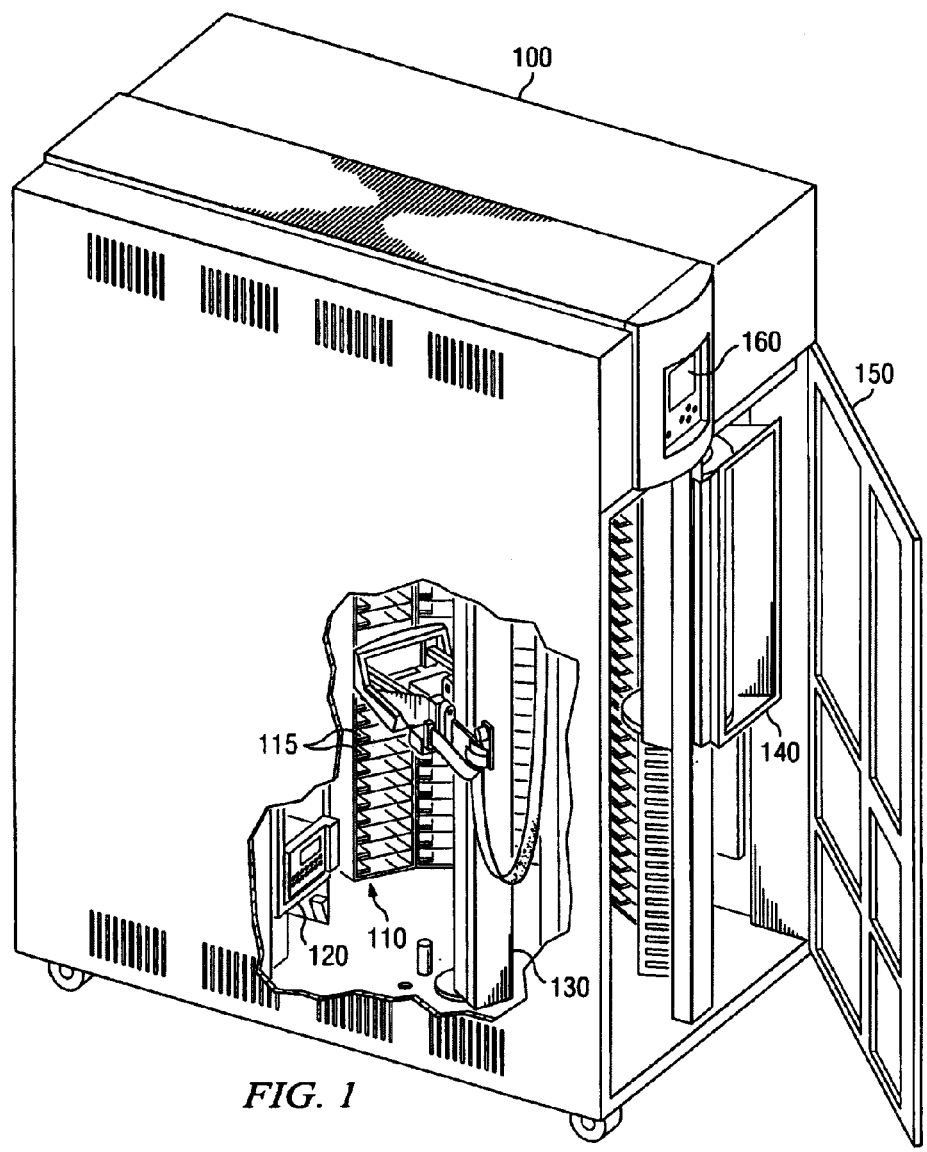
FIG. 1 is an exemplary cutaway drawing of a robotic tape library showing the inner workings of the device.

FIG. 1 depicts a robotic storage media library 100. This particular library 100 stores information on magnetic tape cartridges. The cartridges are stored in one or more storage arrays 110, which are divided into cells 115, each cell 115 storing one cartridge. The storage arrays 110 are arranged in the shape of a partial cylinder. The library 100 also contains one or more drives 120 for retrieving data from the cartridges. A manipulator 130 transfers tapes between the storage arrays 110 and the drives 120.

Also included in the library is a cartridge access port (CAP) 140. The CAP 140 allows cartridges to be added or removed from the library 100 without interfering with the movements of the manipulator 130 or opening the door 150 of the library 100. The manipulator 130 can remove a cartridge from the storage arrays 110 and place it in the CAP 140 to be removed from the library 100, and the manipulator 130 can also retrieve a tape placed within the CAP 140 and store it in the storage arrays 110. There may be more than one CAP in a library, and different CAPs may hold a differing number of tapes. A small control panel 160 allows an operator to start, stop or reset the library 100 and allows an operator to remove or add a cartridge using the CAP 140.

Not depicted in FIG. 1 is a processor (400 in FIG. 4), which coordinates and controls the library. The processor 400 may be integrated into the library 100, or it may be a separate unit coupled to the library 100.

Figure 2:
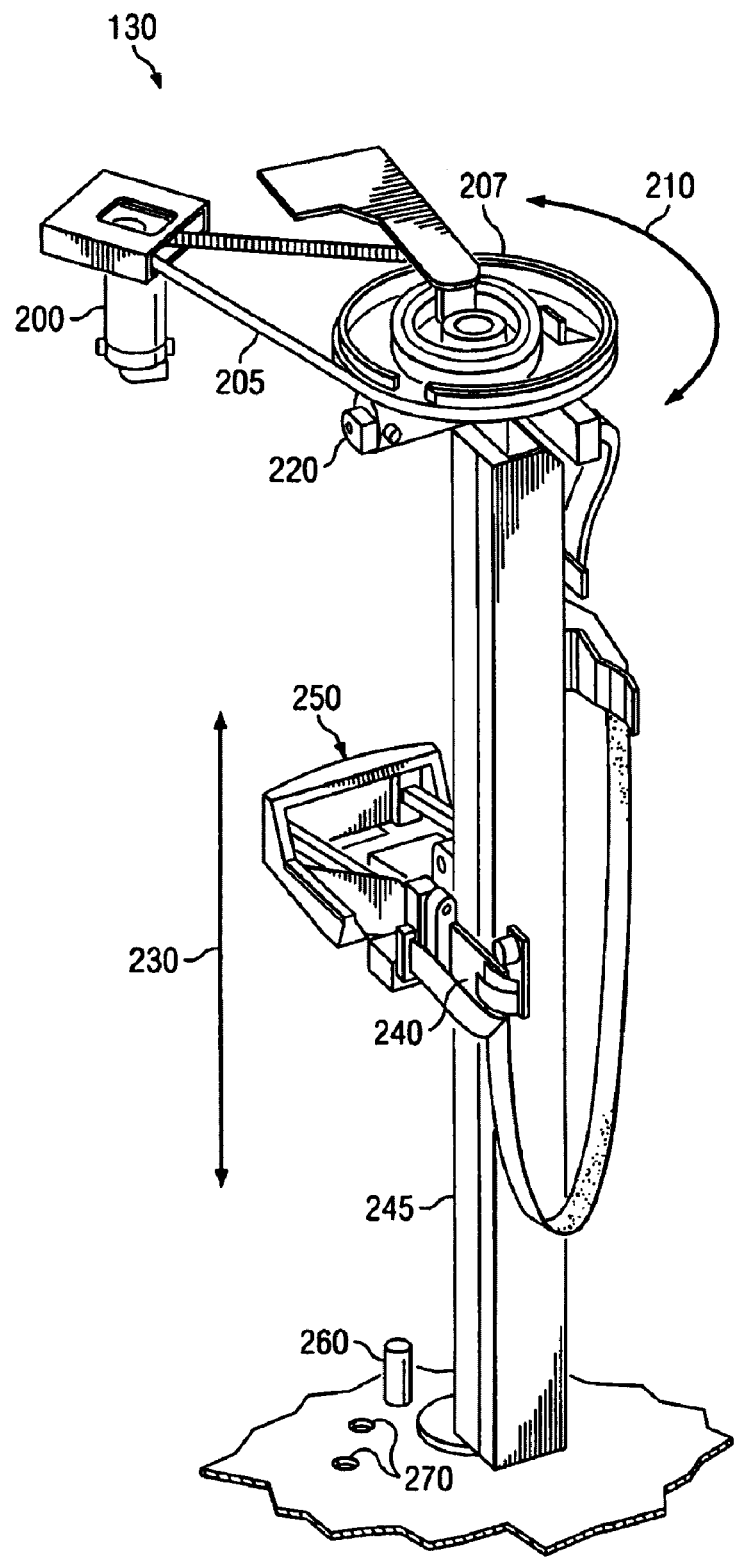
FIG. 2 is an exemplary drawing of a robotic tape manipulator.

FIG. 2 shows the manipulator 130 in more detail. A motor 200, belt 205, and pulley 207 allow the manipulator 130 to move rotationally in the "θ direction" 210. Another motor 220 moves a carriage 240 along a track 245 spanning the length of the manipulator 130 in the "Z direction" 230 (vertically). The motors 200, 220 are equipped with tachometers (not shown) to measure how far the manipulator is moved. The tachometers may reset to show zero distance and may be read electronically.

A hand/camera assembly 250, mounted to the carriage 240, picks up and deposits cartridges. The hand/camera assembly 250 is also equipped with a small video camera for reading identification barcodes printed on cartridges. Being able to read the barcodes makes it possible to perform an audit of all of the cartridges in the library.

An end stop 260, mounted in one of several mounting holes 270, physically limits the rotational movement of the manipulator 130. The required range of rotational movement of the manipulator 130 is a function of the number of storage arrays 110 (FIG. 1) installed. If more storage arrays are installed, a greater range of movement is necessary. The end stop 260 is installed to limit the available movement of the manipulator 130 to that necessary to reach the storage arrays 110, drives 120, and CAPs 140 (FIG. 1).

Figure 3:
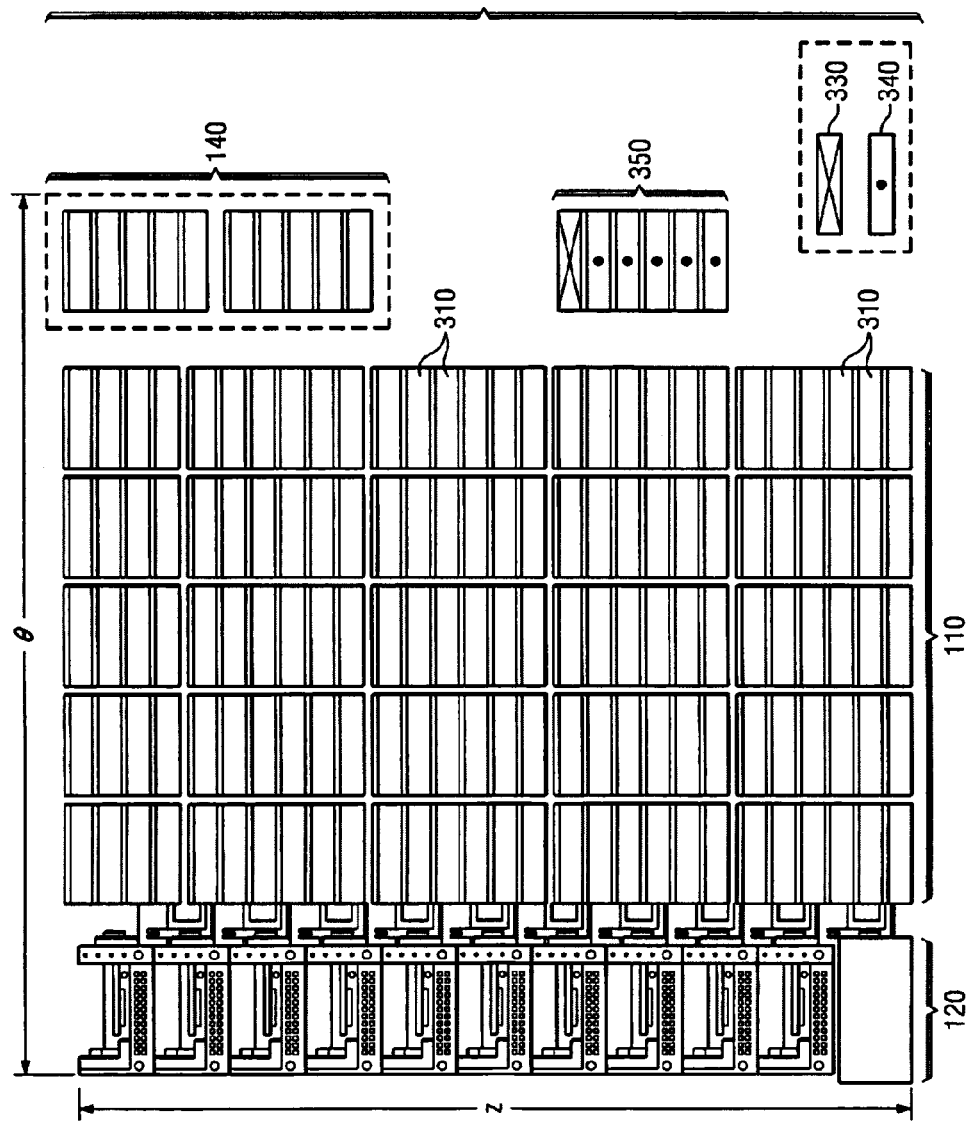
FIG. 3 is an exemplary diagram of the internal layout of a tape library.

FIG. 3 shows the arrangement of storage arrays 110, drives 120, and CAPs 140 within the library 100 from the perspective of the manipulator 130, with the Z direction represented as the vertical and the θ direction represented as the horizontal. The storage arrays 110 are divided into cells 310. Certain cells have special attributes and are known as unique cells 350. These cells are identified according to the legend at the bottom right corner of FIG. 3. A swap cell 330 is used as a temporary storage location for a cartridge, when that cartridge is being exchanged with another cartridge. A reserved cell 340 is used for storing a special cartridge, such as a cleaning cartridge.

Drives 120 are arranged in columns. Each column has a maximum number of drives available to it, in this case ten drives are the maximum. A library 100 may have several columns of drives 120.

Figure 4:
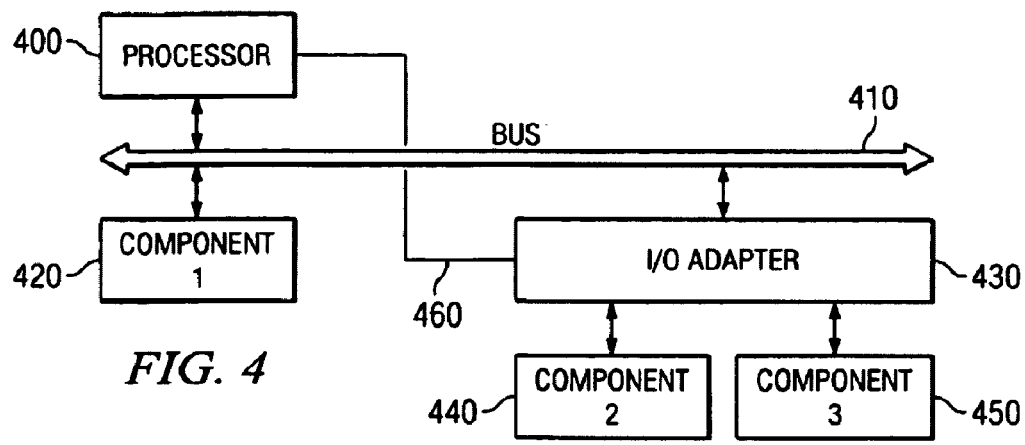
FIG. 4 is an exemplary block diagram of a control system in accordance with the present invention.

A primary feature of the present invention is specially designed hardware for communicating attributes of the hardware to a controlling processor (computer) FIG. 4 shows two ways in which a processor 400 residing on a bus 410 can obtain information from hardware components 420, 440, 450.

One method is for the component 420 to be a bus peripheral. In this method, the component 420 is given a bus address. When the processor 400 needs to obtain information from the component 420, the processor 400 uses the bus 410 to request read information from the location specified by the bus address (that is, the component 420), just as if the component 420 were a memory location.

The other method is for the processor 400 to communicate a query to a component 440 and receive a reply. This can be accomplished by connecting an input/output (I/o) adapter 430 between the bus 410 and the component 440. The processor 400 writes the query through the bus 410 to the I/O adapter 430, which then relays the query to the component 440. The component 440 sends a reply to the I/O adapter 430, which can then be read by the processor 400 through the bus 410. The I/O adapter can, optionally, notify the processor 400 that the reply is available, by sending a signal over an interrupt request line (IRQ).

The present invention provides automatic configuration of the software controlling a robotic media storage library 100 (FIG. 1). Rather than requiring a user of the library 100 to enter configuration information manually into the software, the present invention allows the software to acquire that information for itself. This is done by having the software detect configuration from the library hardware. The library hardware is designed to detect and report information about itself to the software. This configuration information may then be stored as a configuration file for use by the processor 400 in controlling the operation of the library. In this way, the library is automatically configured based on the information obtained from the library hardware.

Figure 5:
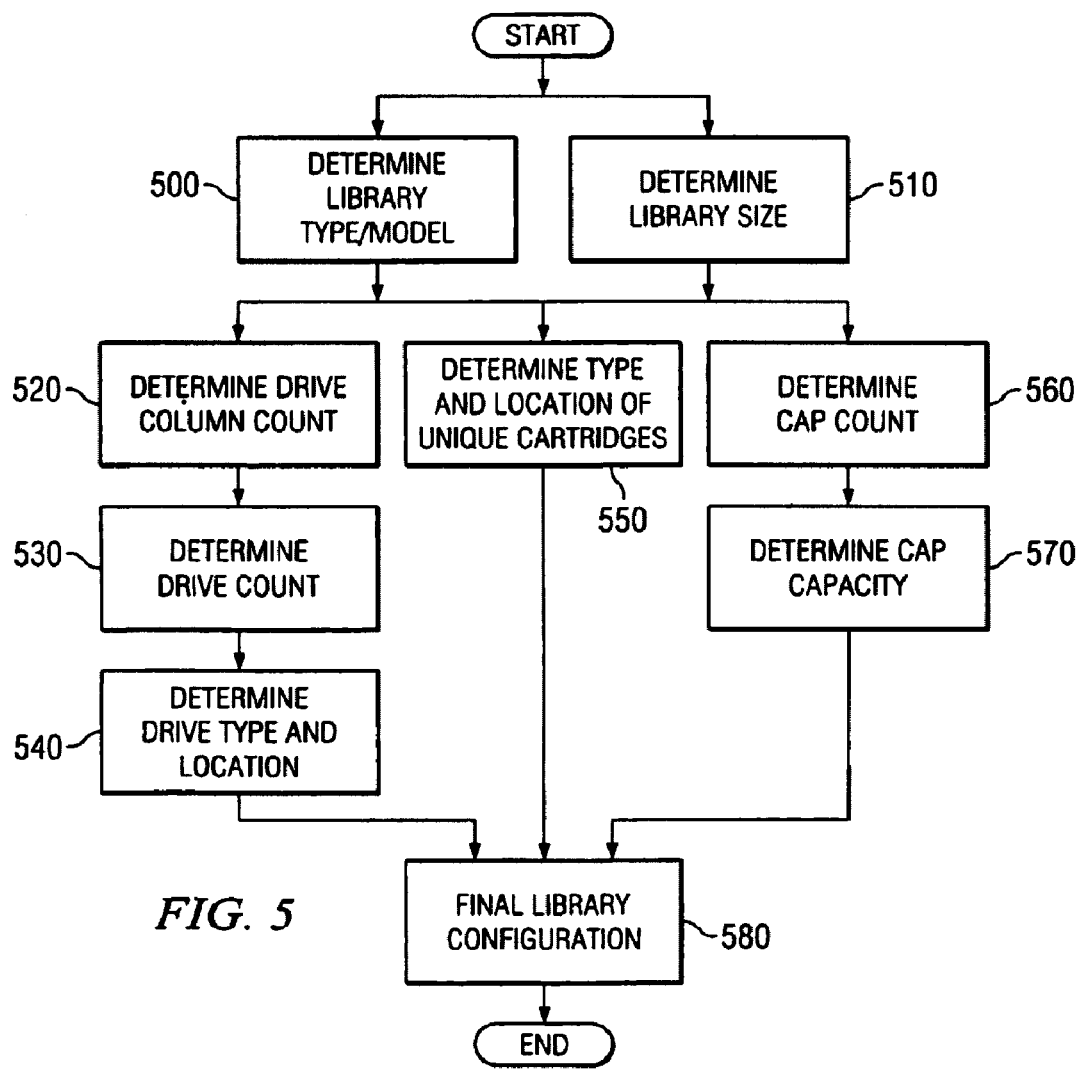
FIG. 5 is a flowchart outlining an exemplary operation for library self-configuration.

FIG. 5 is a flowchart outlining an exemplary operation of the present invention when acquiring information from the hardware and using it to configure the library 100. This sequence of steps should be executed when the library 100 is first powered on and whenever the library 100 is reinitialized.

First, the library type or model is determined (step 500) and the size of the library is determined (step 510). This procedure, described in FIG. 6, involves measuring the range of movement available to the manipulator 130. The range of rotational movement indicates the size of the library in number of storage arrays, since the storage arrays 110 are placed side-by-side. The range of vertical movement indicates the type or model of library being used, since different types or models of library will have differing heights (as will their storage arrays).

Next, three independent sequences of steps take place, which may be performed in parallel or in series. The first sequence involves determining the number of columns of drives (step 520), determining the number of drives in each column (step 530), and determining which types of drives are in each location (step 540). These operations are described in more detail in FIG. 7.

The second sequence of operations is to determine the type and location of the unique cartridges (step 550). This is done by using the video camera on the manipulator 130 (FIG. 1) to audit the cartridges. The unique cartridges are marked with special bar codes to identify them. To audit the cartridges, the manipulator 130 sweeps over all of the cartridges, making note of the locations of the cartridges carrying the special barcodes of the unique cartridges. This process is described in, for example, U.S. Pat. No. 5,323, 327, which is incorporated herein by reference.

The third sequence of operations is to determine the number of CAPs 140 (FIG. 1) and the capacity of the CAPs 140. The capacity of the CAPs 140 is a function of the type of library 100 being used. Since the library was determined by measuring the vertical range of the manipulator 130, the capacity of the CAPs can be determined simply by matching the library type to its respective CAP capacity. The number of CAPs 140 in the library 100 can be detected by using a hardware existence sensor. A hardware existence sensor tells whether a piece of hardware is present within the library 100. It returns a bit, which is zero if the device is not present and one if it is. One exemplary embodiment of a hardware existence sensor is described in FIG. 8.

Finally, after these three sequences of operations collect their data, the software controlling the library is configured to operate in accordance with the data collected (step 580). Configuration involves resolving such issues as which cells are for unique cartridges, where to place cartridges in a CAP, how many cartridges can be removed or added at once, location and type of drives installed, and the like.

Figure 6:
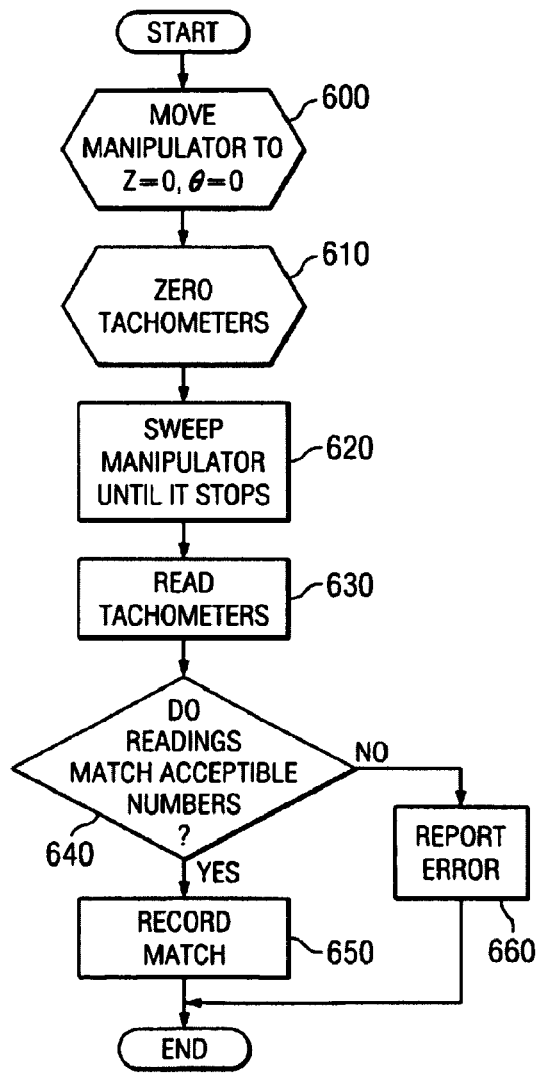
FIG. 6 is a flowchart outlining an exemplary operation for determining storage array size and type.

FIG. 6 is a flowchart depicting the sequence of steps involved in determining the library type and size. As shown in FIG. 6, first the manipulator 130 (FIG. 1) is moved as far as it can go vertically and rotationally in one direction (step 600), to the extreme upper right of its range of motion, for instance. Next, the tachometers described in reference to FIG. 2 are set to zero distance (step 610). After the tachometers are zeroed, the manipulator is extended through its entire range of motion to the opposite extreme of its range (step 620). This would be the extreme lower left, in the above example.

At this point, the tachometers are read (step 630). The readings are then matched against a table of expected values for various library types and sizes (step 640). The table can be stored in non-volatile memory for direct access by the processor 400 (FIG. 4). Alternately, the table can be stored in a compressed format in non-volatile memory and copied in decompressed form into volatile memory at library initialization. If the readings match a particular combination of type and size, the match is reported (step 650), otherwise the lack of a match is treated as an error (step 660). In the event of an error, the above process may be repeated a number of times to compensate for an inaccuracy in measurement.

An optional rotational sweep of the manipulator 130 along the bottom of the library 100 can be performed after determining the library size and type. This optional sweep will detect foreign objects that may be present on the inside floor of the library 100. A foreign object acts like an end stop, obstructing the path of the manipulator 130. If the available range of rotational motion in this optional sweep does not match the previously measured range, a foreign object is probably present within the library 100 and should be removed. An indication to the operator of the presence of the foreign object may be made via the operator panel, for example.

An alternative method of determining library size or type that may be employed independently of or in conjunction with the aforementioned manipulator sweep procedure is to use a jumper wire or other form of switch to set an electrical signal to correspond to a particular value of binary digit (0 or 1). This binary digit, or bit, is detectable by a processor 400 through a hardware existence sensor. A predetermined combination of binary digits can be associated with a library type or size in such a way that the processor 400 will be made aware of the type or size of the library 100 by matching the combination of binary digits against a table in which each combination corresponds to a particular library type or size. As with the previously mentioned table, this table can be stored in non-volatile memory for direct access or stored compressed in non-volatile memory and accessed in decompressed form through a copy in volatile memory.

Figure 7:
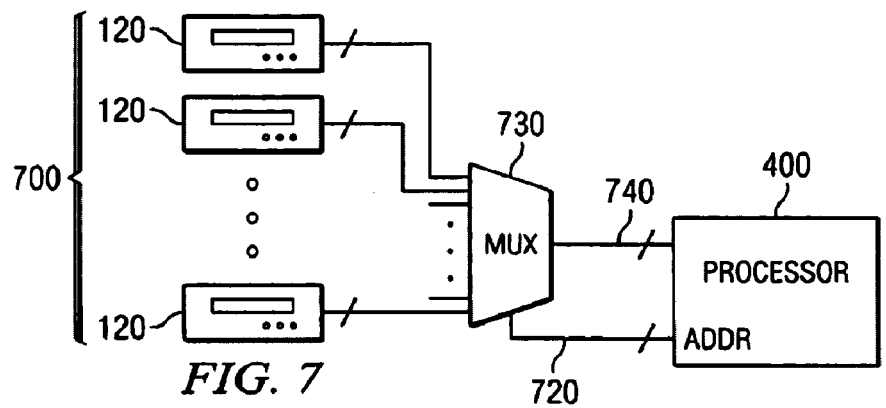
FIG. 7 is a block diagram depicting a column of drives.

Once the library type and size have been detected, the drive column count, drive count, and drive locations and types can be determined from the hardware. FIG. 7 depicts the connection layout of a column 700 of drives 120. Each column has an associated multiplexing card 730. The multiplexing card 730 allows the library's processor 400 to access the different drives 120 of the column 700 through a single data port 740 of the processor 400. The processor 400 specifies an address on an address bus 720, which is fed into the multiplexing card 730. The multiplexing card 730 then selects a drive 120 from the column 700 according to the address. The processor 400 can then communicate with the selected drive 120 through its data port 740.

The number of drive columns is detected 520 (FIG. 5) by using hardware existence sensors (described in FIG. 8) to detect the number of multiplexing cards 730. The number of multiplexing cards 730 is equal to the number of drive columns 700, since each drive column 700 must have a multiplexing card.

Each drive column 700 has a predefined set of physical locations to which a drive 120 may be connected. Not all of the locations need be filled, however. Thus, to determine how many drives are in each column 530 (FIG. 5), each individual drive must be detected. This is done by using a hardware existence sensor (described in FIG. 8) for each drive. The information reported by each hardware existence sensor is multiplexed through the multiplexing card 730, just as other information is.

Figure 7A:
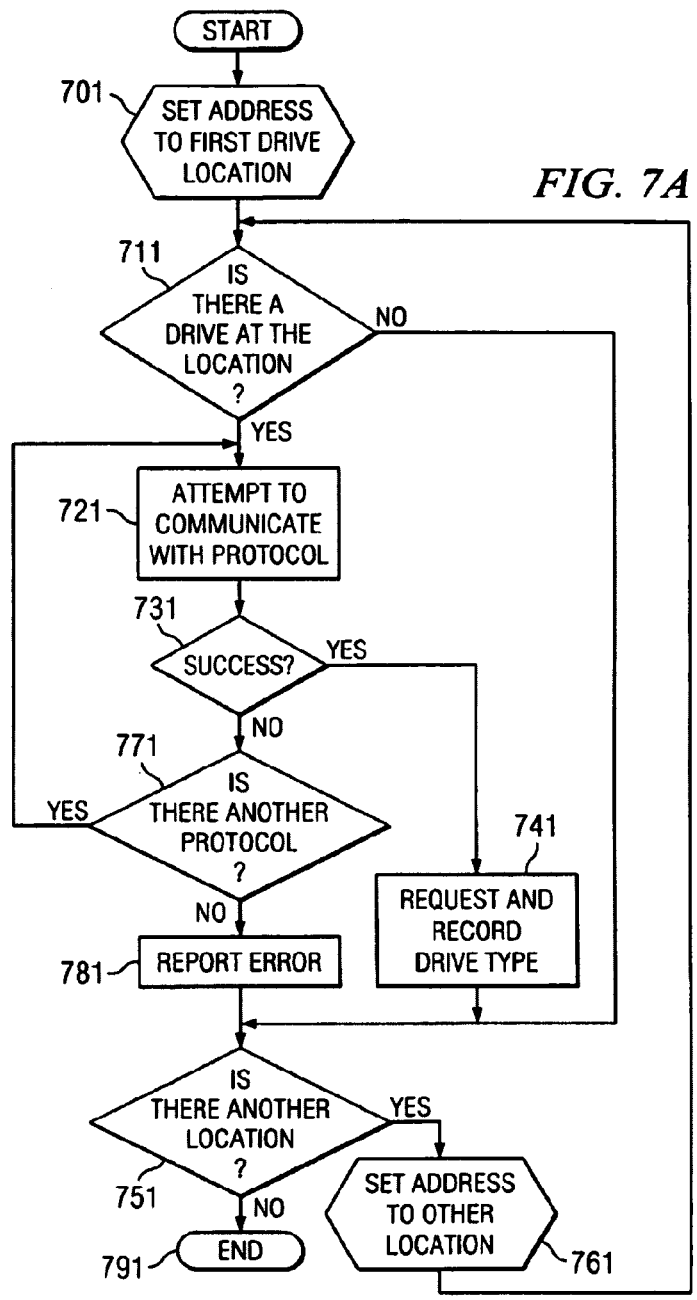
FIG. 7A is a flowchart outlining an exemplary operation for drive detection in accordance with the present invention.

FIG. 7A, when examined with FIG. 7, outlines an exemplary operation of the invention when determining how many drives 120, are in a column 700, which locations those drives 120 are in, and what type of drive 120 each is. First the multiplexing card 730 is set to the address of the first location in the column (step 701). The hardware existence sensor bit for that location is then read by the processor 400 through the multiplexing card 730. If the bit is set, that is if there is a drive 120 in the location (step 711), the processor 400 attempts to communicate with the drive 120 using one of a series of protocols (step 721), where each protocol corresponds to a different type of drive. If the communication was successful (step 731), then the processor 400 queries the drive 120 to ascertain its type. The drive 120 responds by reporting its type to the processor 400, which records the information (step 741). If the protocol was not successful (step 731), the processor 400 checks to see if there is another protocol that could be used (step 771). If there is, then communication is attempted with that protocol (step 721). If not, an error is reported (step 781).

After one location has been dealt with, the processor 400 determines if there are more locations to be checked (step 751). If there are, then the address of the multiplexing card 730 is set to the next location (step 761), and the next location is checked for the existence of a drive (step 711). If not, then the procedure terminates (step 791).

Figure 8:
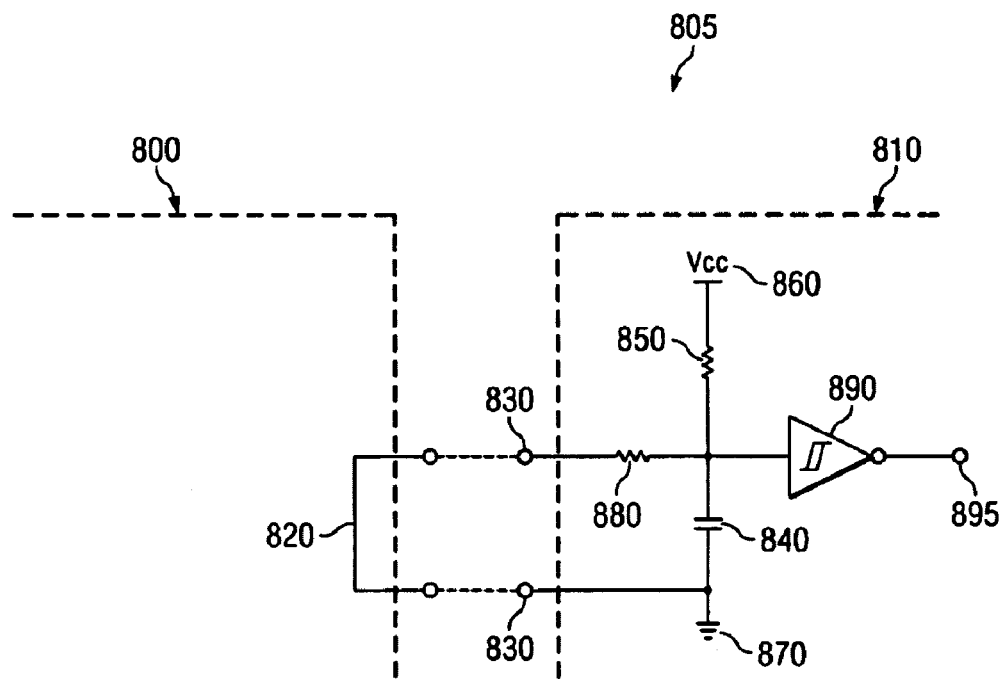
FIG. 8 is an exemplary schematic depicting one possible embodiment of a hardware sensor usable in the present invention.

Detecting the presence of a piece of hardware within the library 100 requires the use of some kind of detection sensor or circuit. FIG. 8 shows how a hardware existence sensor 805 can be implemented. The hardware component 800 to be detected is built in such a way that when it is physically connected to the main structure of the library 810, a jumper 820 attached to the hardware component 800 connects across two terminals 830. Thus, if the hardware component 800 is present within the library 100 (that is, it is connected), the jumper 820 will connect the terminals 830.

The circuitry of the hardware existence sensor 805 in FIG. 8 works as follows. When the hardware component is not connected to the main structure 810, the capacitor 840 is charged to the voltage level (Vcc) of the power supply 860 through a pull-up resistor 850. Since the capacitor 840 is charged to Vcc (high), the output 895 of the Schmitt trigger inverter 890 is brought low. In other words, the output 895 reads as a zero bit (hardware component 800 missing).

When the hardware component 800 is connected, the jumper 820 shorts the two terminals 830. This causes the capacitor 840 to gradually discharge itself through a drain resistor 880. After the capacitor 840 drains sufficiently, the voltage applied to the Schmitt trigger inverter 890 will be low. That will cause the output 895 of the Schmitt trigger inverter 890 to be brought high. Thus, the output 895 will read as a one bit (hardware component 800 present).

The combination of the resistors 850, 880, capacitor 840, and Schmitt trigger inverter 890 prevent the output 895 from reading an erroneous result in the event of a momentary disconnection of the jumper 820 and terminals 830 (such as might happen if the library 100 suffers a physical blow or a quick power failure).

A standard parallel interface integrated circuit such as a MOTOROLA 68230 parallel interface/timer can be connected to the output 895 to make the hardware existence sensor 805 act as a bus peripheral and communicate with the processor 400 using standard memory access techniques as in FIG. 4.

In summary, the disclosed invention provides the ability to configure a robotic storage media library without manual entry of configuration data. This greatly simplifies the process of installing or re-initializing such a library. Upgrades and modifications to a library are made simpler, because the library will simply reconfigure itself.

In addition, the invention also simplifies the process of writing configuration software, because it obviates the need to write user interface code for entering configuration data or to modify that code when new software versions appear. Because less user interaction is needed with the present invention, fewer lines of operating instructions need be printed.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disk, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

What is claimed is:

1. A method of configuring a robotic storage media library, the method comprising:
    determining a number of columns of drives in the robotic storage media library;
    determining a number of drives in each column in the robotic storage media library;
    automatically retrieving hardware characteristics from a hardware component associated with the robotic storage media library; and
    configuring the robotic storage media library based upon the hardware characteristics, the number of columns of drives, or the number of drives in each column.

2. The method of claim 1, wherein the robotic storage media library is a robotic tape library.

3. The method of claim 1, wherein the hardware characteristics comprise existence information, wherein the existence information tells whether an optional hardware device exists within the robotic storage media library.

4. The method of claim 3, wherein the hardware component is a hardware existence sensor.

5. The method of claim 1, wherein the hardware component comprises a storage media identifier device.

6. The method of claim 5, wherein the storage media identifier device comprises one of a video camera barcode reader and a laser barcode reader.

7. The method of claim 1, wherein the hardware characteristics comprise at least one of a library size, a library type, drive column information, drive installation location, a drive type, library unique media information and cartridge access port information.

8. The method of claim 7, wherein the cartridge access port information comprises one of a cartridge access port count and a cartridge access port capacity.

9. The method of claim 7, wherein the drive column information comprises one of a drive column count and a drive column capacity.

10. The method of claim 7, wherein the library unique media information comprises one of a unique media location and a unique media type.

11. The method of claim 1, comprising the step of:
    accessing the hardware component through a bus.

12. The method of claim 1, comprising the step of:
    accessing the hardware component through an input/output adaptor.

13. The method of claim 1, wherein the hardware component is a storage media drive.

14. The method of claim 1, wherein the hardware component is a robotic storage media manipulator.

15. The method of claim 1, comprising the step of:
    executing the automatically retrieving and configuring steps upon initialization of the robotic storage media library.

16. A method of determining storage array characteristics of a storage array with which a robotic storage media manipulator is associated so as to access storage media, the method comprising:
    automatically measuring an extent of possible movement of the robotic storage media manipulator;
    reporting storage array characteristics based upon the extent of possible movement of the robotic storage media manipulator;
    moving the robotic storage media manipulator through the extent of possible movement;
    reading data from a tachometer associated with the storage media manipulator; and
    calculating the extent of possible movement from the data.

17. The method of claim 16, wherein the storage array characteristics comprise one of a storage array size and a storage array type.

18. The method of claim 16, wherein the extent of possible movement is the distance the robotic storage media manipulator can travel along an axis.

19. The method of claim 18, wherein the axis is at least one of axis is a vertical (Z) axis and a cylindrical rotational (θ) axis.

20. The method of claim 19, wherein the extent of possible movement is defined by the physical presence of at least one end stop in a path of the robotic storage media manipulator.

21. The method of claim 16, comprising the step of:
    matching the extent of possible movement against a supported value; and
    identifying a storage array size based upon the supported value.

22. A robotic storage media library controlled by a computer running library software, the library comprising:
    a storage array, wherein the storage array stores media;
    a robotic manipulator;
    measuring means for measuring length of motion of the robotic manipulator; and
    at least one media drive, wherein the robotic manipulator moves media to and from the storage array and to and from the at least one media drive; at initialization of the library, the manipulator moves through its full range of motion and the measuring means makes a measurement of the range; the computer reads the measurement, and the library software matches the measurement with a predefined value to determine characteristics of the storage array, wherein the measurement means comprises a tachometer.

23. The library of claim 22, wherein the characteristics comprise at least one of a storage array type and a storage array size.

24. The library of claim 22, comprising at least one end stop, wherein the motion of the manipulator is limited by the end stop.

25. A robotic storage media library controlled by a computer running library software, the library comprising:
- a storage array, wherein the storage array stores media;
- a robotic manipulator;
- a media drive; and
- a hardware sensor, wherein the robotic manipulator moves media to and from the storage array and to and from the at least one media drive; the robotic manipulator determines a number of columns of drives in the robotic storage media library; the robotic manipulator determines a number of drives in each column in the robotic storage media library; the hardware sensor senses whether a hardware component is connected to the library, and the computer recognizes whether the hardware component is connected to the library from the sensor.

26. The library of claim 25, wherein the hardware component is at least one of a cartridge access port, a multiplexing card, a switch and at least one media drive.

* * * * *